(12) United States Patent
Zhu

(10) Patent No.: US 11,522,753 B2
(45) Date of Patent: Dec. 6, 2022

(54) METHOD AND DEVICE FOR DETERMINING TRANSMISSION DIRECTION INFORMATION

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 66 days.

(21) Appl. No.: 16/957,636

(22) PCT Filed: Dec. 28, 2017

(86) PCT No.: PCT/CN2017/119490
§ 371 (c)(1),
(2) Date: Jun. 24, 2020

(87) PCT Pub. No.: WO2019/127243
PCT Pub. Date: Jul. 4, 2019

(65) Prior Publication Data
US 2020/0351159 A1 Nov. 5, 2020

(51) Int. Cl.
*H04L 41/0806* (2022.01)
*H04W 72/04* (2009.01)
*H04W 88/02* (2009.01)

(52) U.S. Cl.
CPC ..... *H04L 41/0806* (2013.01); *H04W 72/0413* (2013.01); *H04W 72/0453* (2013.01); *H04W 88/02* (2013.01)

(58) Field of Classification Search
CPC ........... H04W 72/082; H04W 72/1231; H04W 24/02; H04W 72/1289; H04W 72/0406;
(Continued)

(56) References Cited

U.S. PATENT DOCUMENTS

2012/0320806 A1* 12/2012 Ji .................. H04L 27/2602
370/280
2013/0242812 A1* 9/2013 Khoryaev ............ H04L 5/14
370/278
(Continued)

FOREIGN PATENT DOCUMENTS

CN 101848125 A 9/2010
CN 102231643 A 11/2011
(Continued)

OTHER PUBLICATIONS

International Search Report dated Sep. 30, 2018 in PCT/CN2017/119490 filed on Dec. 28, 2017, citing documents AA, AB, and AO-AQ therein, 2 pages.
(Continued)

*Primary Examiner* — Yee F Lam
(74) *Attorney, Agent, or Firm* — Oblon, McClelland, Maier & Neustadt, L.L.P.

(57) ABSTRACT

Aspects of the disclosure are directed to a method for determining transmission direction information. The method can include acquiring direction configuration information dynamically transmitted by a base station, the direction configuration information being used to indicate transmission direction information of an information transmission resource. Further the method can include determining, according to the direction configuration information, a target information transmission unit whose transmission direction indication is ambiguous, and determining, according to a preset rule, transmission direction information of the target information transmission unit.

7 Claims, 8 Drawing Sheets

(58) Field of Classification Search
CPC .. H04W 72/042; H04L 5/0092; H04L 5/1469; H04L 5/0053; H04L 5/0082; H04L 27/2602; H04L 1/0061; H04B 7/2656
See application file for complete search history.

(56) References Cited

U.S. PATENT DOCUMENTS

| | | | | |
|---|---|---|---|---|
| 2013/0272170 | A1* | 10/2013 | Chatterjee | H04W 24/02 |
| | | | | 370/280 |
| 2013/0294297 | A1 | 11/2013 | Lee | |
| 2013/0294359 | A1 | 11/2013 | Lee | |
| 2016/0014791 | A1* | 1/2016 | Liu | H04W 72/0413 |
| | | | | 370/252 |
| 2016/0197690 | A1* | 7/2016 | Li | H04B 1/48 |
| | | | | 370/278 |
| 2018/0091282 | A1* | 3/2018 | Lim | H04L 5/0092 |
| 2018/0227936 | A1* | 8/2018 | Yerramalli | H04L 1/0067 |
| 2019/0200389 | A1* | 6/2019 | Li | H04W 72/1231 |
| 2020/0187228 | A1* | 6/2020 | Cheng | H04W 72/1289 |

FOREIGN PATENT DOCUMENTS

| | | |
|---|---|---|
| CN | 103378963 A | 10/2013 |
| CN | 103384185 A | 11/2013 |
| CN | 104105203 A | 10/2014 |
| CN | 107223362 A | 9/2017 |
| JP | 2011-205205 A | 10/2011 |
| RU | 2 518 376 C2 | 6/2014 |

OTHER PUBLICATIONS

Combined Chinese Office Action and Search Report dated Jun. 25, 2019 in Patent Application No. 201780002372.X filed on Dec. 28, 2017.
"Discussion on HARQ and UL-grant timing with dynamic TDD UL-DL configuration", Alcatel-Lucent Shanghai Bell, Alcatel-Lucent, 3GPP TSG RAN WGI Meeting #68bis, R1-121260, Jeju, Korea, Mar. 26-30, 2012, pp. 1-6.
Japanese Office Action dated Jun. 22, 2021 in Japanese Patent Application No. 2020-533123 (with English translation). citing documents AX and AY therein, 10 pages.
"Remaining issued on GC-PDCCH", MediaTek Inc., 3GPP TSG RAN WG1 Meeting #91 R1-1721045, Retrieved from the internet: URL:http://www.3gpp.org/ftp/tsg_ran/WG1_RL1/TSGR_91/Docs/R1-1721045.zip, Nov. 27- Dec. 1, 2017, 6 pages.
"On the remaining issues of group common PDCCH"[online], Xiaomi, 3GPP TSG RAN WG1 Meeting #91 R1 -1720773, Retrieved from the internet: URL: http://www.3gpp.org/ftp/tsg_ran/WG1_RL1/TSGR1_91/Docs/R1-1720773.zip, Dec. 1, 2017, 8 pages.
Extended European Search Report dated Nov. 12, 2020 in European Patent Application No. 17936110.0, citing documents AY and AZ therein, 10 pages.
Combined Russian Office Action and Search Report dated Nov. 26, 2020 for Russian Patent Application No. 2020123089 (with English translation), citing document AO therein, 13 pages.
Apple Inc: "Slot Format Indicator in Group-common PDCCH", 3GPP Draft; R1-1717782 Slot Format Indicator in Group-Common PDCCH.V3, 3rd Generation Partnership Project (3GPP), Mobile Competence Centre ; 650, Route Des Lucioles ; F-06921 Sophia-Antipolis Cedex; vol. RAN WG1, No. Prague, Czech; Oct. 9, 2017-Oct. 13, 2017; Oct. 8, 2017 (Oct. 8, 2017), XP051340967, Retrieved from the Internet: URL:http://www.3gpp.org/ftp/Meetings_3GPP_SYNC/RAN1/Docs/ [retrieved on Oct. 8, 2017].
OPPO: "Discussion of Group Common PDCCH", 3GPP Draft; R1-1718044, 3rd Generation Partnership Project (3GPP), Mobile Competence Centre ; 650, Route Des Lucioles ; F-06921 Sophia-Antipolis Cedex ; France, vol. RAN WG1, No. Prague, CZ; Oct. 9, 2017-Oct. 13, 2017; Oct. 8, 2017 (Oct. 8, 2017), XP051341226, Retrieved from the Internet: URL:http://www.3gpp.org/ftp/Meetings_3GPP_SYNC/RAN1/Docs/ [retrieved on Oct. 8, 2017].
Office Action dated Jan. 13, 2022 in Korean Application No. 10-2020-7019599 (with English translation), citing document AX therein, 10 pages.
Intel Corporation, R1-1717380, On group-common PDCCH, 3GPP TSG RAN WG1 #90bis, 3GPP server publication date (Oct. 3, 2017), 11 pages.

\* cited by examiner

METHOD AND DEVICE FOR DETERMINING TRANSMISSION DIRECTION INFORMATION

CROSS-REFERENCE TO RELATED APPLICATION

This application is the 371 application of PCT Application No. PCT/CN2017/119490, filed Dec. 28, 2017, the entire contents of which are incorporated herein by reference.

TECHNICAL FIELD

The present disclosure relates to the field of communication technology, and in particular, to a method and device for determining transmission direction information.

BACKGROUND

With the development of wireless communication technology, mobile communication technology has gradually evolved towards 5G networks. The capabilities of 5G networks in terms of data transmission rate, coverage, delay, and capacity have been greatly improved, and can be applied to many fields such as broadband connection, Internet of Things, Internet of Vehicles, and wide area coverage. The currently determined 5G network service types mainly include URLLC (Ultra Reliable Low Latency Communication) service, mMTC (massive Machine Type Communication) service, and eMBB (enhanced Mobile Broad Band, enhanced Mobile broadband) business. Different service types can have different requirements for wireless communication technologies. For example, requirements of eMBB service type focus on large bandwidth and high rate, requirements of URLLC service type focus on relatively high reliability and low latency, while requirements of mMTC service type focus on the large number of connections. In order to meet different business requirements, an important feature of 5G network communication technology is to support flexible resource configuration.

Flexible configuration of resources can include flexible configuration of the transmission direction of time-frequency resources by the base station. In the 5G network communication system, for the same UE, the base station can configure different direction configuration information according to the service transmission requirements at different times. Due to the high flexibility of the above transmission direction information configuration, a transmission direction of a basic information transmission unit may appear to be repeatedly configured and with different transmission directions, or configuration may be omitted and other unexpected situation may be occurred in some basic information transmission units, which leads to chaotic UE behavior, resulting in system instability and poor user experience.

SUMMARY

Embodiments of the present disclosure provide a method and an apparatus for determining transmission direction information, which can effectively determine transmission direction information of transmission resource, avoid chaotic terminal behavior and ensure system stability.

According to a first aspect of the present disclosure, there is provided a method for determining transmission direction information applied to a user equipment. The method can include acquiring direction configuration information dynamically sent by a base station, the direction configuration information being indicative of transmission direction information of information transmission resource. The method can further include determining, according to the direction configuration information, a target information transmission unit indicated with undetermined transmission direction, and determining transmission direction information for the target information transmission unit according to a preset rule.

The direction configuration information can include at least direction indication information of a basic information transmission unit.

In some embodiments, the determining, according to the direction configuration information, a target information transmission unit indicated with undetermined transmission direction can further include determining, according to the direction configuration information, whether each basic information transmission unit in a preset detection time range has corresponding direction indication information, and determining, when at least one basic information transmission unit within the preset detection time range has no corresponding direction indication information, the at least one basic information transmission unit as the target information transmission unit.

Optionally, the determining, according to the direction configuration information, a target information transmission unit indicated with undetermined transmission direction can include determining, according to the direction configuration information, at least two pieces of direction indication information for a preset basic information transmission unit, determining whether the at least two pieces of direction indication information are consistent with each other, and determining, when the at least two pieces of direction indication information are not consistent with each other, the preset basic information transmission unit as the target information transmission unit.

The direction configuration information can further include identification information of the basic information transmission unit. The determining, according to the direction configuration information, at least two pieces of direction indication information for a preset basic information transmission unit can include determining whether there is a repeated indication identifier according to the identification information of the basic information transmission unit included in each piece of direction configuration information, and determining, when the repeated indication identifier is present, the at least two pieces of direction indication information corresponding to the repeated indication identifier.

Optionally, the transmission direction information can be determined for the target information transmission unit in any one of following manners: determining, according to direction indication information of an indicated transmission unit, the transmission direction information for the target information transmission unit, wherein the indicated transmission unit is a basic information transmission unit within a same detection time range as the target information transmission unit; determining the transmission direction information of the target information transmission unit as unknown configuration; or determining the transmission direction information of the target information transmission unit according to first preset direction configuration information.

Optionally, the transmission direction information can determined for the target information transmission unit in any one of following manners: determining, according to latest direction indication information as obtained, the transmission direction information for the target information transmission unit; determining the transmission direction information of the target information transmission unit as unknown configuration; or re-determining the transmission direction information of the target information transmission unit according to first preset direction configuration information.

Optionally, when the basic information transmission unit is composed of unit time domain resource with smaller resource granularity, and the direction indication information has a direction indication granularity based on the unit time domain resource. The determining transmission direction information for the target information transmission unit according to a preset rule can include determining, according to at least two pieces of direction indication information corresponding to the target information transmission unit, target unit time domain resource with inconsistent direction indication, and determining, according to second preset direction configuration information, the transmission direction information for the target unit time domain resource.

According to a second aspect of the disclosure, there is provided a device for determining transmission direction information provided in a user equipment. The device can include an information acquiring module, configured to acquired direction configuration information dynamically sent by a base station, the direction configuration information being indicative of transmission direction information of information transmission resource, a target determining module, configured to determine, according to the direction configuration information, a target information transmission unit indicated with undetermined transmission direction, and a direction information determining module, configured to determine transmission direction information for the target information transmission unit according to a preset rule.

Optionally, the direction configuration information includes at least direction indication information of a basic information transmission unit.

The target determining module can include a first detecting sub-module that is configured to determine, according to the direction configuration information, whether each basic information transmission unit in a preset detection time range has corresponding direction indication information, and a first target determining sub-module that is configured to determine, when at least one basic information transmission unit within the preset detection time range has no corresponding direction indication information, the at least one basic information transmission unit as the target information transmission unit.

Further, the target determining module can include an indication information determining sub-module that is configured to determine, according to the direction configuration information, at least two pieces of direction indication information for a preset basic information transmission unit, a second detecting sub-module that is configured to determine whether the at least two pieces of direction indication information are consistent with each other, and a second target determining sub-module that is configured to determine, when the at least two pieces of direction indication information are not consistent with each other, the preset basic information transmission unit as the target information transmission unit.

Optionally, the direction configuration information further includes identification information of the basic information transmission unit. The indication information determining sub-module can include a target identifier determining unit that is configured to determine whether there is a repeated indication identifier according to the identification information of the basic information transmission unit included in each piece of direction configuration information, and an indication information determining unit that is configured to determine, when the repeated indication identifier is present, the at least two pieces of direction indication information corresponding to the repeated indication identifier.

Optionally, the direction information determining module includes any one of a first direction information determining sub-module that is configured to determine, according to direction indication information of an indicated transmission unit, the transmission direction information for the target information transmission unit, wherein the indicated transmission unit is a basic information transmission unit within a same detection time range as the target information transmission unit, a second direction information determining sub-module that is configured to determine the transmission direction information of the target information transmission unit as unknown configuration; or a third direction information determining sub-module that is configured to determine the transmission direction information of the target information transmission unit according to first preset direction configuration information.

The direction information determining module includes any one of a fourth direction information determining sub-module that is configured to determine, according to latest direction indication information as obtained, the transmission direction information for the target information transmission unit; a fifth direction information determining sub-module that is configured to determine the transmission direction information of the target information transmission unit as unknown configuration; or a sixth direction information determining sub-module that is configured to re-determine the transmission direction information of the target information transmission unit according to first preset direction configuration information.

When the basic information transmission unit is composed of unit time domain resource with smaller resource granularity, and the direction indication information can have a direction indication granularity based on the unit time domain resource. The direction information determining module can include a target resource determining sub-module that is configured to determine, according to at least two pieces of direction indication information corresponding to the target information transmission unit, target unit time domain resource with inconsistent direction indication, and a direction information determining sub-module that is configured to determine, according to second preset direction configuration information, the transmission direction information for the target unit time domain resource.

According to a third aspect of the embodiments of the disclosure, there is provided a non-transitory computer readable storage medium having stored thereon computer instructions. The instructions are executable by a processor to perform the method according to any embodiment of the first aspect as described above.

According to a fourth aspect of the embodiments of the disclosure, there is provided an apparatus for determining transmission direction information, including a processor and a memory for storing instructions executable by the processor. The processor can be configured to acquire direction configuration information dynamically sent by a base station, the direction configuration information being indicative of transmission direction information of information transmission resource, determine according to the direction configuration information, a target information transmission unit indicated with undetermined transmission direction, and determine transmission direction information for the target information transmission unit according to a preset rule.

The technical solutions provided by the embodiments of the present disclosure may include several beneficial effects. For example, in the embodiments of the present disclosure, when the transmission direction information indicated by a base station for the target information transmission unit is unclear, the transmission direction information of the target information transmission unit may be effectively determined according to the preset rule, so as to avoid UE behavior disorder and system instability caused by the unclear transmission direction information, thereby ensuring the flexibility of the transmission resource configuration of the system, while effectively improving stability of system and reliability of information transmission. Thus, different service requirements can be met, and the user experience of the 5G network device can be improved.

BRIEF DESCRIPTION OF THE DRAWINGS

The drawings herein, which are incorporated into and constitute a part of this specification, illustrate embodiments consistent with the present disclosure and are used together with the specification to explain the principles of the present disclosure.

FIG. 4-1 is a schematic diagram illustrating determination of transmission direction information according to an exemplary embodiment of the present disclosure.

FIG. 4-2 is another schematic diagram illustrating determination of transmission direction information according to an exemplary embodiment of the present disclosure.

FIG. 9-1 is a schematic diagram illustrating an application scenario for determining transmission direction information according to an exemplary embodiment of the present disclosure.

FIG. 9-2 is a schematic diagram illustrating another application scenario for determining transmission direction information according to an exemplary embodiment of the present disclosure.

FIG. 9-3 is a schematic diagram illustrating still another application scenario for determining transmission direction information according to an exemplary embodiment of the present disclosure.

DETAILED DESCRIPTION

Figure 1:
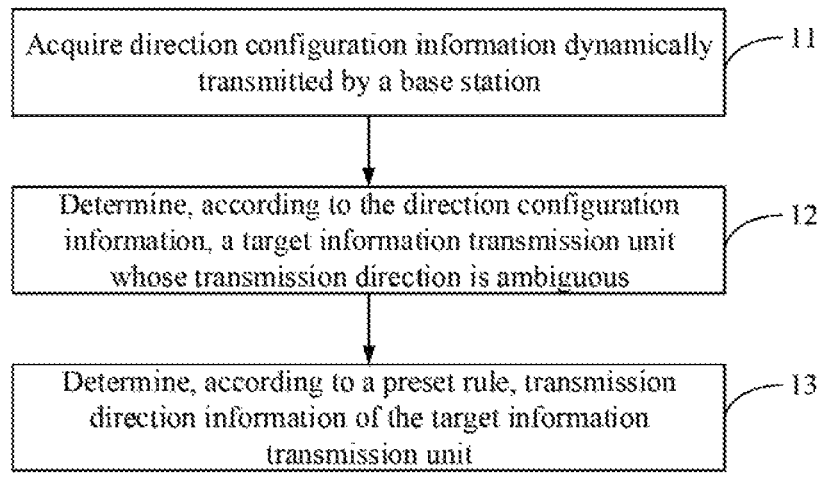
FIG. 1 is a flow chart illustrating a method for determining transmission direction information according to an exemplary embodiment.

Exemplary embodiments will be described in detail here, examples of which are shown in the drawings. When the following description refers to the accompanying drawings, unless otherwise indicated, the same numerals in different drawings represent the same or similar elements. The embodiments described in the following exemplary embodiments do not represent all embodiments consistent with the present disclosure. Rather, they are merely examples of devices and methods consistent with some aspects of the disclosure as detailed in the appended claims.

The implementation body involved in the present disclosure may include a base station and a user equipment (UE). The base station may be a base station, a sub-base station and the like provided with a large-scale antenna array. The UE may be a user terminal, a user node, a mobile terminal, a tablet computer, or the like. In a specific implementation example, the base station and the UE may be independent of each other and, at the same time, are in contact with each other to jointly implement the technical solution provided by the present disclosure.

An application scenario of an exemplary embodiment of the present disclosure may be as follows. In a case where the transmission direction of part of time domain resource is not clear in the direction configuration information acquired by the UE, the UE is not sure whether the part of the time domain resource is available or, the UE is not sure about how to use the part of the time domain resource for information transmission even when it is determined that the above resource is available. In view of above, the present disclosure provides a method for determining transmission direction information, which can determine the transmission direction information for the above-mentioned partial transmission resource, thereby determining the UE behavior later.

Referring to FIG. 1, which is a flowchart illustrating a method for determining transmission direction information according to an exemplary embodiment, the method is applied to UE and may include the following steps.

In step 11, direction configuration information dynamically sent by a base station is acquired, wherein the direction configuration information is indicative of transmission direction information of information transmission resource. In a 5G communication system, a base station uses basic information transmission units to schedule information transmission resource. The above information transmission resource refer to time-frequency resource carrying data transmission and, in the 5G communication system, generally refer to time domain resource. In the present disclosure, the basic information transmission unit in the time domain may be a subframe, a slot, a mini-slot, an OFDM (Orthogonal Frequency Division Multiplexing) symbol and the like, but the disclosure is not limited thereto. In an embodiment, one symbol occupies the shortest time; the mini-slot may include several symbols, for example, 7 symbols; the number of symbols included in the time slot is slightly larger than the number of symbols in the mini-slot, for example, one slot consists of 14 symbols.

When scheduling time domain resource for UE, the base station informs the UE of transmission direction of the time domain resource. The transmission direction information of time domain resource is information indicating that the current resource is used for uplink information transmission, or downlink information transmission, or not for information transmission.

Figure 2:
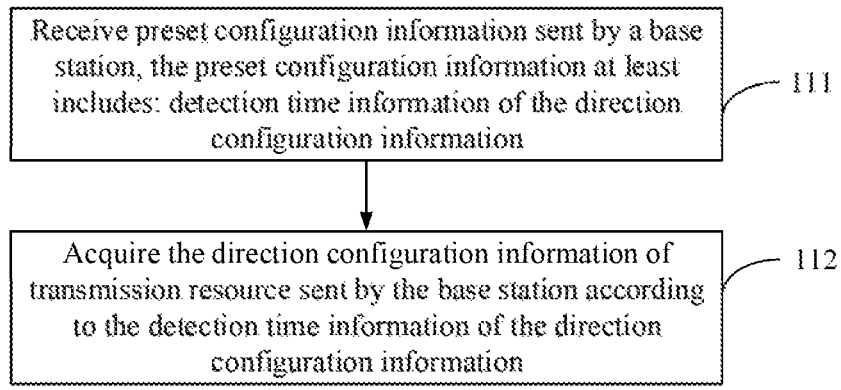
FIG. 2 is a flowchart illustrating a method for determining transmission direction information according to another exemplary embodiment of the present disclosure.

When UE acquires the direction configuration information dynamically sent by the base station, referring to FIG. 2 which is a flowchart illustrating a method for determining transmission direction information according to another exemplary embodiment, the above step 11 may include following steps.

In step 111, preset configuration information sent by a base station is received, the preset configuration information at least can include detection time information of the direction configuration information. In exemplary embodiments of the present disclosure, the above-mentioned preset configuration information is used for informing the UE how to detect the direction configuration information sent by the base station. In an embodiment of the present disclosure, the base station may load the foregoing preset configuration information into broadcast signaling, such as system information, and send it to the UE in a broadcast manner.

In another embodiment, after the UE accesses the cell network, the base station may load the above-mentioned preset configuration information into upper layer RRC (Radio Resource Control) signaling, and send it to the UE in a unicast manner, so as to inform the target UE how to detect the direction configuration information.

Additionally, the preset configuration information at least can include a detection time information of the direction configuration information. Based on the above detection time information of the direction configuration information, the UE may determine within which time range to detect the direction configuration information sent by the base station.

In another embodiment of the present disclosure, the preset configuration information may further include location information of the direction configuration information. Based on the above location information of the direction configuration information, the UE can determine in which basic information transmission unit or which unit time domain resource of a specified basic information transmission unit to obtain the direction configuration information.

In the present disclosure, the base station may use periodic configuration to provide the direction configuration information in data transmission link. In this case, the detection time information of the direction configuration information may specifically be a detection period of the direction configuration information with a preset duration, for example, a detection period including 4 basic information transmission units. After the UE acquires the above detection period of the direction configuration information, it may detect the direction configuration information every 4 basic information transmission units.

In step 112, the direction configuration information of transmission resource sent by the base station is acquired according to the detection time information of the direction configuration information.

In the present disclosure, the base station may dynamically load the above-mentioned direction configuration information into PDCCH (Physical Downlink Control Channel) signaling of the physical layer, and dynamically send it to the UE. After acquiring the detection time of the direction configuration information, the UE may detect the direction configuration information sent by the base station according to a preset detection manner within the detection time range.

Regarding the detection manner of the direction configuration information, in an embodiment, if the base station does not inform the providing location of the direction configuration information in the preset configuration information, the UE may monitor the direction configuration information by blind detection, that is, in real time, within the detection time range.

In another embodiment of the present disclosure, the base station may also inform the UE of the providing location of the direction configuration information through the preset configuration information. In other words, the preset configuration information may further include location information of the direction configuration information. For example, the direction configuration information is provided in a preset unit time domain resource in the first basic information transmission unit within the detection time range. Correspondingly, after acquiring the location information of the direction configuration information, the UE can accurately locate and quickly acquired the direction configuration information according to the location information within the detection time range, thereby improving the detection efficiency of the direction configuration information.

In step 12, a target information transmission unit indicated with undetermined transmission direction is determined according to the direction configuration information.

As described above, in the 5G wireless communication system, the base station performs resource configuration with the basic information transmission unit as the scheduling granularity. Under normal circumstances, the UE may explicitly determine the transmission direction information of each basic information transmission unit within a detection time range according to one or more pieces of direction configuration information acquired in sequence.

Since there are many types of 5G network services, the base station needs to dynamically and flexibly configure time domain resource according to different service requirements. In the above process of dynamically configuring direction information for time domain resource, the following two situations may occur. In the first situation, some basic information transmission units within a preset detection time range is not indicated with the transmission direction information. In the second situation, some basic information transmission units within a preset detection time range is indicated with a transmission direction in different direction configuration information, and the indicated direction information is inconsistent with each other. Both of the above situations belong to the case where the base station does not clearly indicate the transmission direction of the transmission resource.

In the embodiment of the present disclosure, each piece of direction configuration information dynamically acquired by the UE includes at least direction indication information of the basic information transmission unit. The above-mentioned direction indication information may include: "uplink" "downlink", and "unknown".

Correspondingly, the above step 12 may include the following two implementation manners. In the first implementation manner, corresponding to the determination manner of the foregoing first situation, referring to FIG. 3 which is a flowchart illustrating a method for determining transmission direction information according to another exemplary embodiment, the above step 12 may include following steps.

In step 1211, it is determined, according to the direction configuration information, whether each basic information transmission unit in a preset detection time range has corresponding direction indication information.

In the present disclosure, one piece of direction configuration information may indicate direction information for a preset number of basic information transmission units, and the preset number may be greater than the number of basic information transmission units corresponding to a preset detection time range. In other words, the transmission direction of a basic information transmission unit included in the current detection time range may be indicated in the direction configuration information acquired within the previous detection time range, as shown in the example of direction information indication of Slot 4 in FIG. 4-2.

In step 1212, when at least one basic information transmission unit within the preset detection time range has no corresponding direction indication information, the at least one basic information transmission unit is determined as the target information transmission unit. The target information transmission unit refers to a basic information transmission unit without being indicated with a transmission direction.

Figures 1, 4:
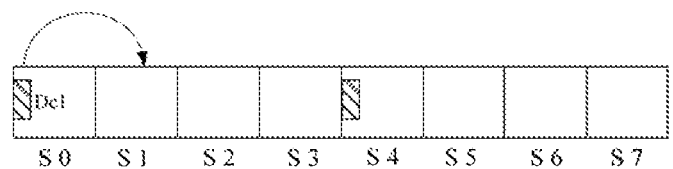
Figures 2, 4:
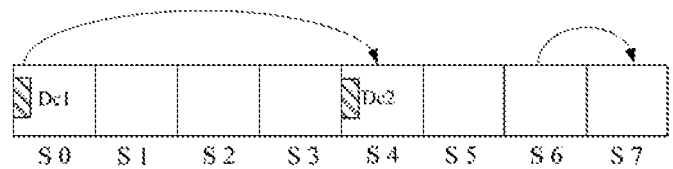

For example, referring to FIG. 4-1, it is a schematic diagram illustrating determination of transmission direction information according to an exemplary embodiment of the present disclosure, assuming that the preset detection time range indicated by the preset configuration information includes 4 basic information transmission units, that is, the base station instructs the UE to detect the direction configuration information once every 4 basic information transmission units. Taking the basic information transmission unit is a slot as an example, as shown in FIG. 4-1, it is assumed that the UE detects, in a slot numbered with "0", that is, in slot 0, the PDCCH signaling carrying the direction configuration information which is denoted as Dc1. If the above Dc1 only indicates the transmission direction information of slot0 and slot1, that is, S0 and S1 in the figure, but does not indicate the transmission direction information of slot2, slot3, that is, S2 and S3 in the figure, the above slot2 and slot3 are determined as the target information transmission unit of which the transmission direction is to be determined.

Referring to FIG. 4-2 which is a schematic diagram illustrating an application scenario for determining transmission direction information according to an exemplary embodiment, in another embodiment of the present disclosure, the number of basic information transmission units indicated by one piece of direction configuration information may be greater than the number of basic information transmission units included in the preset detection time range. As shown in FIG. 4-2, assuming that Dc1 indicates the transmission direction information of slot0, slot1, slot2, slot3, and slot4; the second direction configuration information carried in slot4, that is, Dc2 indicates the transmission direction information of slot6 and slot7, then it can be determined, according to the first direction configuration information carried by Dc1 and the second direction configuration information carried by Dc2, that slot5 has no corresponding direction indication information, so slot5 is determined as the target information transmission unit.

The second implementation manner corresponds to the determination manner of the second situation described above.

Figure 5:
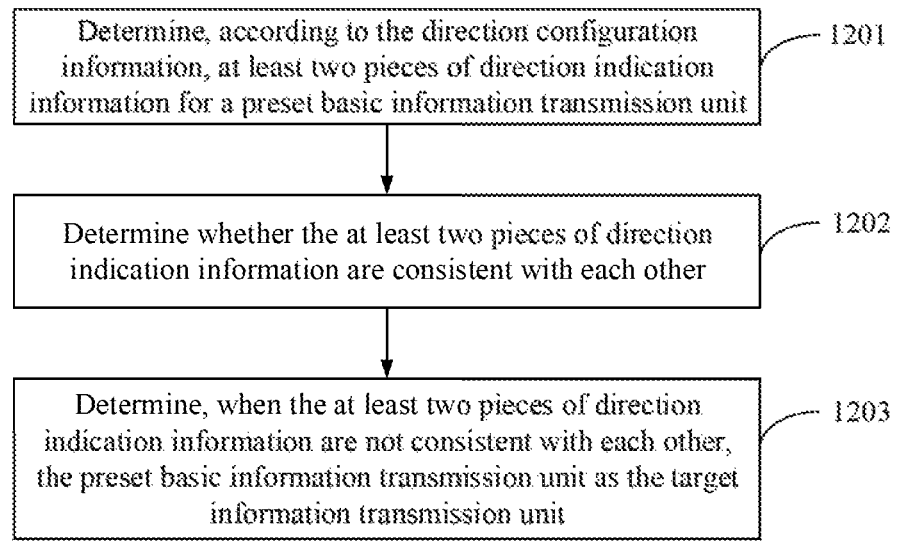
FIG. 5 is a flowchart illustrating a method for determining transmission direction information according to another exemplary embodiment of the present disclosure.

Referring to FIG. 5, which is a flowchart illustrating a method for determining transmission direction information according to another exemplary embodiment, the above step 12 may include following steps.

In step 1201, at least two pieces of direction indication information are determined, according to the direction configuration information, for a preset basic information transmission unit.

In an embodiment of the present disclosure, if the direction configuration information includes only the direction indication information, the UE may determine the basic information transmission unit corresponding to the above direction indication information according to a preset rule. For example, assuming that two sets of direction indication information are included in the direction configuration information acquired by the UE in current basic information transmission unit, the UE may determine, based on the preset rule, the two sets of direction indication correspond to the current basic information transmission unit and a subsequent basic information transmission unit adjacent to the current basic information transmission unit according to a position arrangement of the direction indication information.

Figure 6:
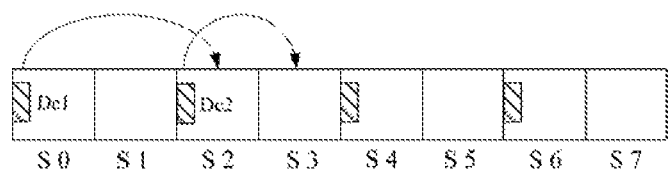
FIG. 6 is another schematic diagram illustrating determination of transmission direction information according to an exemplary embodiment of the present disclosure.

Referring to FIG. 6, which is a schematic diagram illustrating another scenario for determining transmission direction information according to an exemplary embodiment, it is assumed that the UE acquires the direction configuration information Dc1 in the current basic information transmission unit (e.g., slot0), and Dc1 includes three pieces of direction indication information: direction information 1, direction information 2, direction information 3. Then, the UE may determine that the above three pieces of direction indication information respectively correspond to slot0, slot1, and slot2 according to the preset rule, as shown in Table 1.

TABLE 1

| Direction Indication Information | Basic Information Transmission Unit |
| --- | --- |
| Direction Information 1 | slot0 |
| Direction Information 2 | slot1 |
| Direction Information 3 | slot2 |

Similarly, if the direction configuration information Dc2 acquired in slot2 includes two pieces of direction indication information: direction information 4 and direction information 5, respectively. According to the above preset rule, the UE can determine that the two pieces of direction indication information correspond to slot2 and slot3, respectively, as shown in Table 2.

TABLE 2

| Direction Indication Information | Basic Information Transmission Unit |
| --- | --- |
| Direction Information 4 | slot2 |
| Direction Information 5 | slot3 |

It can be known from Tables 1 and 2 above that the direction information 3 and the direction information 4 belong to two pieces of direction indication information for the same preset basic information transmission unit slot2.

In another embodiment of the present disclosure, the direction configuration information includes the correspondence between the identifier of the basic information transmission unit and the direction indication information.

Figure 7:
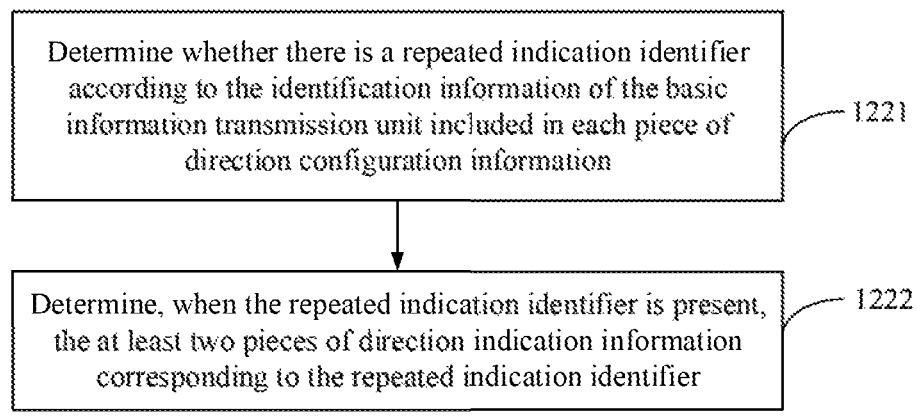
FIG. 7 is a flowchart illustrating a method for determining transmission direction information according to another exemplary embodiment of the present disclosure.

Referring to FIG. 7, which is a flowchart illustrating a method for determining transmission direction information according to another exemplary embodiment, the foregoing step 1201 may include following steps.

In step 1221, it is determined whether there is a repeated indication identifier according to the identification information of the basic information transmission unit included in each piece of direction configuration information. The repeated indication identifier refers to an identifier of the basic information transmission unit to which the direction indication information is repeatedly assigned. It should be noted that, in the present disclosure, in different direction configuration information, the identifier of the same basic information transmission unit may be indicated in different manners, but the UE may determine that they indicate the same basic information transmission unit.

In step 1222, when the repeated indication identifier is present, the at least two pieces of direction indication information corresponding to the repeated indication identifier are determined.

In the embodiment of the present disclosure, if the direction configuration information includes the identifier of the basic information transmission unit indicated with direction information, it can be quickly determined which basic information transmission unit or units are repeatedly configured with the direction indication information according to the identification information of the basic information transmission unit, thereby improving the detection efficiency of the target information transmission unit and, thus, improving the efficiency of determining unique direction information for the target information transmission unit.

In step 1202, it is determined whether the at least two pieces of direction indication information are consistent with each other. The embodiment of the present disclosure, it is determined whether the contents of two or more pieces of direction indication information are completely consistent with each other. If they are completely consistent with each other, the transmission direction of the target information transmission unit may be determined according to any direction indication information. If they are not completely consistent with each other, the following step 1203 is performed.

In step 1203, when the at least two pieces of direction indication information are not consistent with each other, the preset basic information transmission unit is determined as the target information transmission unit.

As shown in FIG. 6, it is assumed that the detection time period of the above direction configuration information includes 2 basic information transmission units, and the above basic information transmission unit still takes a slot as an example, assuming that the UE detects the first direction configuration information in Dc1 of slot0, the Dc1 indicates the transmission direction of slot0, slot1 and slot2 respectively. When slot2 arrives, the UE detects the second direction configuration information in Dc2 of slot2, which indicates the transmission direction of slot2 and slot3, respectively. Ten the basic information transmission unit slot2 belongs to the target information transmission unit which is the transmission unit being repeatedly indicated.

Assuming that the direction indication information of slot 2 included in Dc1 is represented as first direction indication information F21, the direction indication information of slot 2 included in Dc2 is represented as second direction indication information F22, the UE can further determine the whether the direction indication information F21 is consistent with the second direction indication information F22. If the contents of the two pieces of direction indication information are not completely identical, the basic information transmission unit slot2, that is, S2 shown in FIG. 6 is determined as the target information transmission unit.

In step 13, the transmission direction information is determined for the target information transmission unit according to a preset rule.

Corresponding to the first situation above, in an embodiment of the present disclosure, the UE may determine the transmission direction information for the target information transmission unit in any of the following manners. In the first manner, the transmission direction information of the target information transmission unit is determined according to direction indication information of an indicated transmission unit, wherein the indicated transmission unit is a basic information transmission unit within a same detection time range as the target information transmission unit. For example, as shown in FIG. 4-1, for the target information transmission units slot2 and slot3, slot0 and slot1 belong to the indicated transmission unit.

As shown in FIG. 4-1, the transmission direction information of slot0 and slot1 may be determined as the transmission direction information of slot2 and slot3 which are the target information transmission units.

In FIG. 4-2, the direction indication information of slot 4 may be determined as the direction indication information of slot 5. Optionally, according to a preset rule instructed by the base station in advance, the transmission direction information of slot5 may be determined according to the direction indication information of slot6 or slot7.

In the second manner, according to the indication information acquired in advance, the transmission direction information of the target information transmission unit is determined as "unknown", where "unknown" indicates that no direction is configured for the basic information transmission unit. When the basic information transmission unit is configured as unknown, it indicates that the base station instructs the UE not to use the basic information transmission unit for information transmission. When the basic information transmission unit arrives, the UE does not send uplink information, does not receive downlink information, and does no detection. In other words, the basic information transmission unit is not available to the UE.

For example, the base station specifies that the transmission direction of all target information transmission units whose transmission direction is unclear is determined to be unknown, which indicates that the UE does not use the target information transmission units for information transmission. When the target information transmission units arrive, neither downlink information detection nor uplink data transmission is performed using the transmission units, thereby saving UE power consumption.

In the third manner, the transmission direction information of the target information transmission unit is determined according to first preset direction configuration information. In an exemplary embodiment of the present disclosure, the UE may also determine the transmission direction information for the target information transmission unit according to the previously obtained direction configuration information.

In an embodiment of the present disclosure, in addition to dynamically acquiring direction configuration information, the UE may also be preset with other direction configuration information, for example, system broadcast direction configuration information, or the direction configuration information determined in advance by UE based on the system configuration information and the UE device type. However, the priority of the first preset direction configuration information is lower than the priority of the dynamically acquired direction configuration information. In general, the transmission direction information of a basic information transmission unit is determined according to the direction configuration information with the highest priority.

When the transmission direction of a basic information transmission unit cannot be determined according to the direction configuration information of the highest priority, the transmission direction information of the target information transmission unit can be determined according to the direction configuration information with the second highest priority, for example, the transmission direction information of the target information transmission unit may be determined according to the direction configuration information determined in advance based on device type of UE.

Corresponding to the above-mentioned second situation, in the embodiments of the present disclosure, in addition to the above second manner, the transmission direction information of the target information transmission unit may be determined in any of following manners.

In the fourth manner, the transmission direction information of the target information transmission unit is determined according to latest direction indication information as obtained. As shown in FIG. 6, the transmission direction information of slot 2 may be determined transmission to the direction indication information of slot 2 included in Dc2.

In the fifth manner, the acquired direction indication information of the target information transmission unit is determined as invalid information, and the transmission direction information of the target information transmission unit is re-determined according to the first preset direction configuration information. Similar to the third manner above, the transmission direction information of slot2 in FIG. 6 is re-determined according to the direction configuration information acquired in advance by UE with the second highest priority, for example, the direction configuration information instructed by system based on device type. The re-determined direction configuration information may be not completely consistent with or even completely different from the above-mentioned transmission direction information as acquired.

In the present disclosure, the above first preset direction configuration information may configure transmission direction for one basic information transmission unit.

In the sixth manner, the basic information transmission unit is composed of unit time domain resource with smaller resource granularity, and the direction indication information of the target information transmission unit configures the transmission direction with the unit time domain resource as the direction indication granularity. In the embodiment of the present disclosure, the UE may re-determine the transmission direction information only for the target unit time domain resource of which the direction indications are inconsistent, so as to reduce the amount of information processing.

Figure 8:
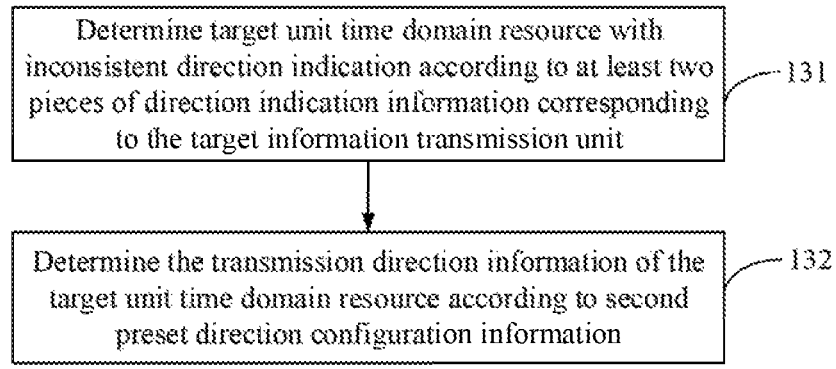
FIG. 8 is a flowchart illustrating a method for determining transmission direction information according to another exemplary embodiment of the present disclosure.

For the above sixth manner, referring to FIG. 8 which is a flowchart illustrating a method for determining transmission direction information according to another exemplary embodiment, the above step 13 may include following steps.

In step 131, target unit time domain resource with inconsistent direction indication is determined according to at least two pieces of direction indication information corresponding to the target information transmission unit.

In step 132, the transmission direction information of the target unit time domain resource is determined according to second preset direction configuration information. The second preset direction configuration information in the embodiment of the present disclosure may indicate transmission direction information for a unit time domain resource with a smaller resource granularity.

Figures 1, 9:
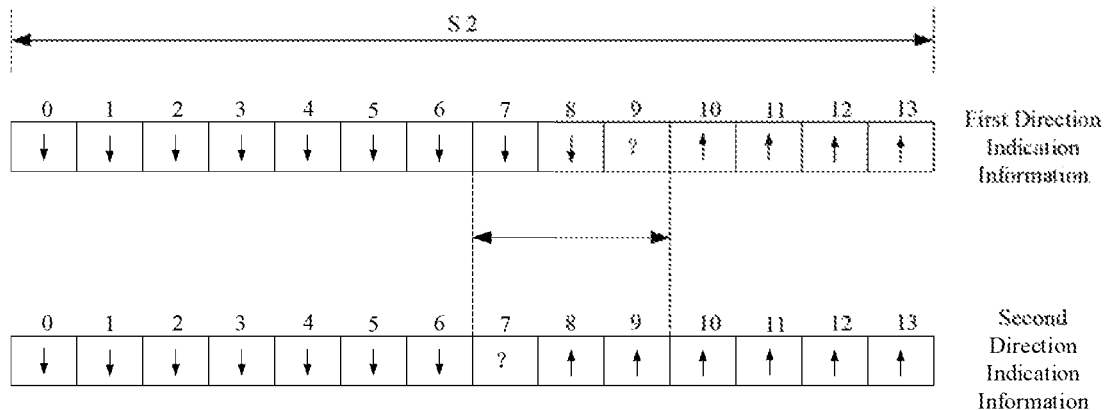
Figures 2, 9:
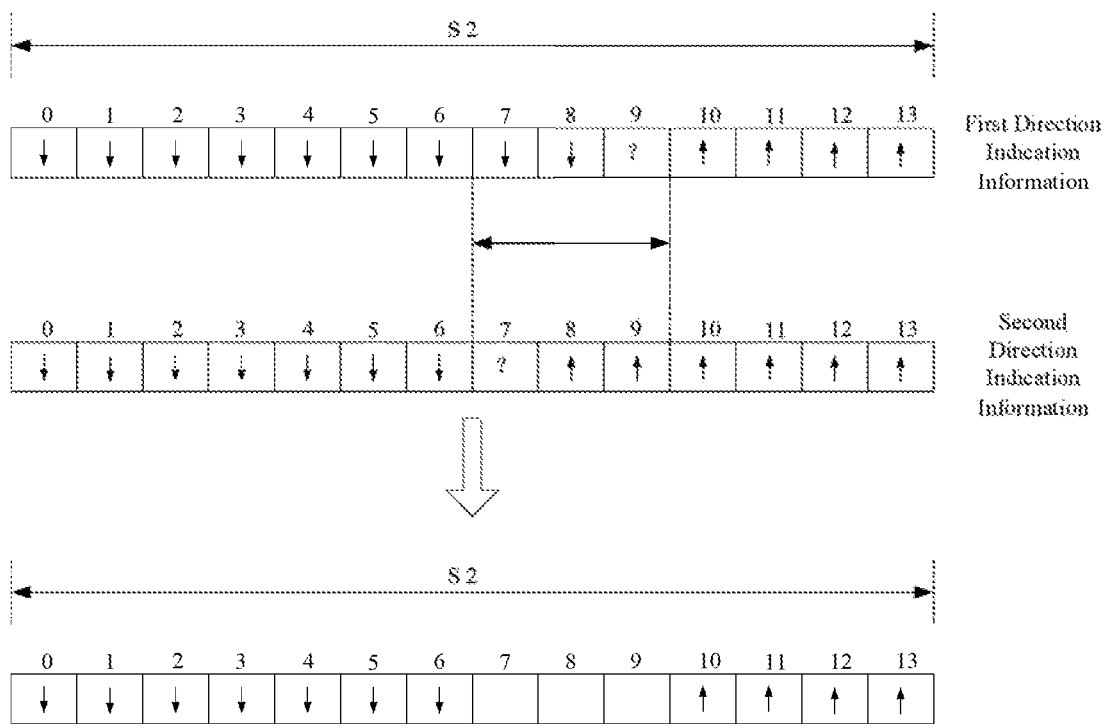
Figures 3, 9:
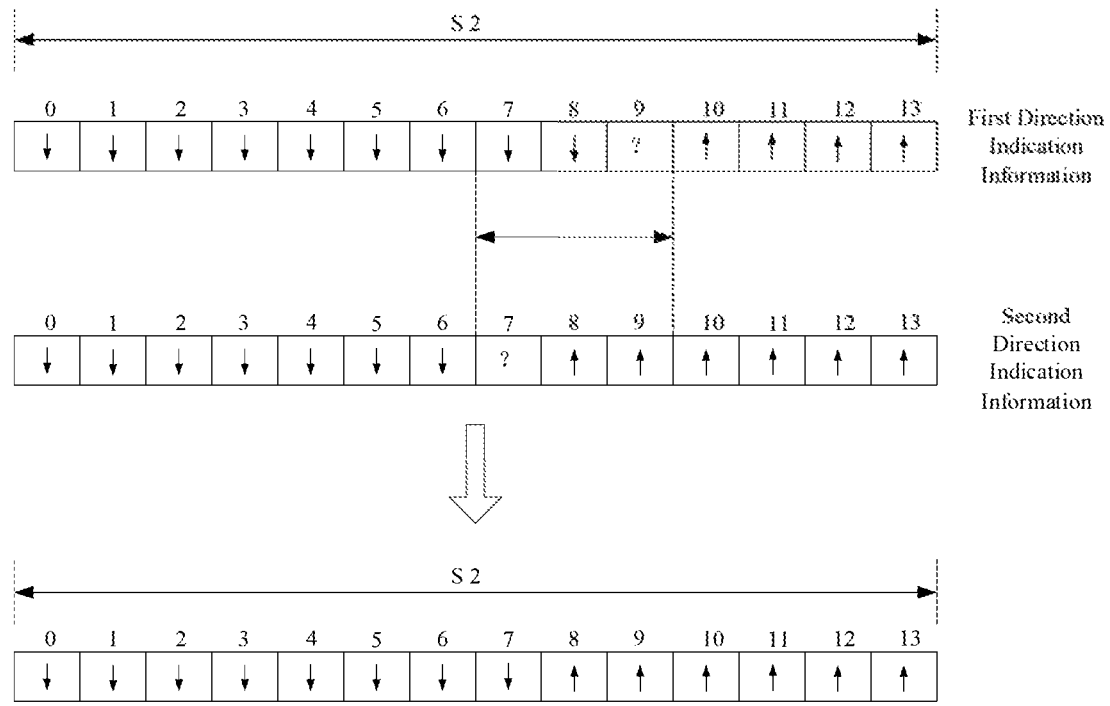

FIG. 9-1 is a schematic diagram illustrating another application scenario for determining transmission direction information according to an exemplary embodiment. Still taking the basic information transmission unit as a slot, for example, a slot in 5G network includes 14 OFDM symbols, assuming that the target information transmission unit which is repeatedly indicated is slot2 in FIG. 6, the direction indication of the first direction indication information F21 for slot2 is shown in the upper diagram of FIG. 9-1, where symbol 9 represents that no direction information is indicated; the direction indication of the second direction indication information F22 for slot2 is shown in the lower diagram of FIG. 9-1, where symbol 7 represents that no direction information is indicated. Through comparison, it can be seen that the symbols with sequence numbers 7, 8, and 9 are indicated with inconsistency direction information by the two pieces of direction indication information, so symbol 7, symbol 8, and symbol 9 are target unit time domain resource of which the transmission direction is to be determined.

In an embodiment of the present disclosure, the transmission direction information of the target unit time domain resource may also be determined in the manner similar to the above second manner, third manner, and fourth manner.

For example, the transmission direction information of symbol 7, symbol 8, and symbol 9 may be determined as unknown, indicating that the UE does not use the above target unit time domain resource to determine the transmission direction information. Similar to the above second manner, the result is shown in FIG. 9-2. The blank symbol in FIG. 9-2 indicates that the transmission direction information of the symbol is "unknown" (no configuration).

Figure 3:
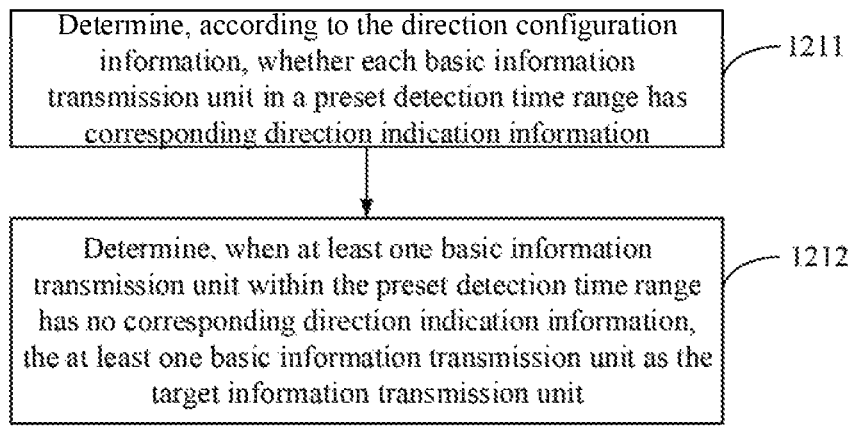
FIG. 3 is a flowchart illustrating a method for determining transmission direction information according to another exemplary embodiment of the present disclosure.

Optionally, according to a preset rule, for example, the latest indication direction information in the second direction indication information F22 as acquired may serve as a basis. Similar to the above fourth manner, for the symbol 7 that is not indicated with the direction information in the second direction indication information F22, its direction information may be determined based on the first direction indication information in a complementary manner, and the result is shown in FIG. 9-3.

Similarly, in another embodiment of the present disclosure, the first direction indication information may be used as the basis, while the second direction indication information may be used in an auxiliary way according to a preset rule for re-determining the transmission direction information of slot2, but the disclosure is not limited thereto.

In summary, according to the embodiments of the present disclosure of the method for determining transmission direction information, when the transmission direction information indicated by a base station for the target information transmission unit is unclear, the transmission direction information of the target information transmission unit may be effectively determined according to the preset rule, so as to avoid UE behavior disorder and system instability caused by the unclear transmission direction information, thereby ensuring the flexibility of the transmission resource configuration of the system, while effectively improving stability of system and reliability of information transmission. Thus, different service requirements can be met, and the user experience of the 5G network device can be improved.

As to the foregoing method embodiments, for the sake of brief description, they are all expressed as a series of steps, but those skilled in the art should know that this disclosure is not limited by the sequence of steps as described. According to the disclosure, some steps can be performed in other orders or simultaneously.

Secondly, those skilled in the art should also know that the embodiments described in the specification are all optional embodiments, and the involved steps and modules are not necessarily required by the present disclosure.

Corresponding to the foregoing embodiment of the method for implementing described functions, the present disclosure also provides embodiments of a device for implementing the described functions and a corresponding terminal.

Figure 10:
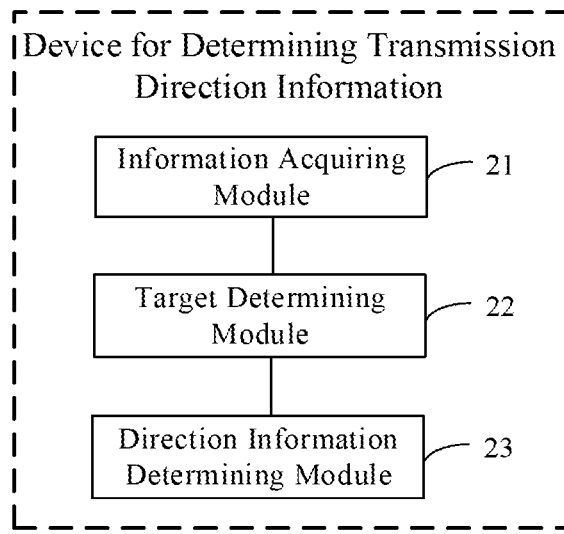
FIG. 10 is a block diagram illustrating a device for determining transmission direction information according to an exemplary embodiment.

FIG. 10 is a block diagram illustrating a device for determining transmission direction information according to an exemplary embodiment. The device is provided in a user equipment and can include an information acquiring module 21 that is configured to acquired direction configuration information dynamically sent by a base station, the direction configuration information being indicative of transmission direction information of information transmission resource, a target determining module 22 that is configured to determine, according to the direction configuration information, a target information transmission unit indicated with undetermined transmission direction, and a direction information determining module 23 that is configured to determine transmission direction information for the target information transmission unit according to a preset rule.

In an embodiment of the disclosure, the direction configuration information can include at least direction indication information of a basic information transmission unit.

Figure 11:
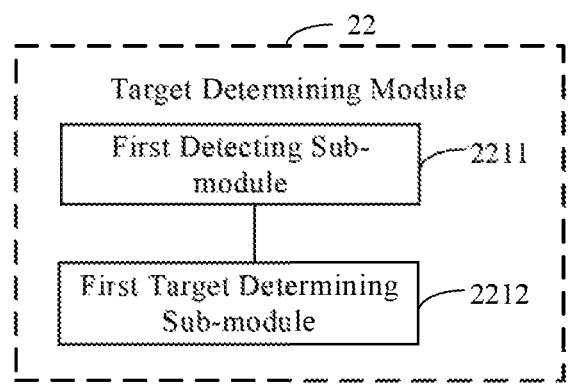
FIG. 11 is a block diagram illustrating a device for determining transmission direction information according to another exemplary embodiment of the present disclosure.

FIG. 11 is a block diagram illustrating a device for determining transmission direction information according to another exemplary embodiment of the present disclosure. Based on the embodiment of the device as shown in FIG. 10, the target determining module 22 can include a first detecting sub-module 2211 that is configured to determine, according to the direction configuration information, whether each basic information transmission unit in a preset detection time range has corresponding direction indication information, and a first target determining sub-module 2212 that is configured to determine, when at least one basic information transmission unit within the preset detection time range has no corresponding direction indication information, the at least one basic information transmission unit as the target information transmission unit.

Figure 12:
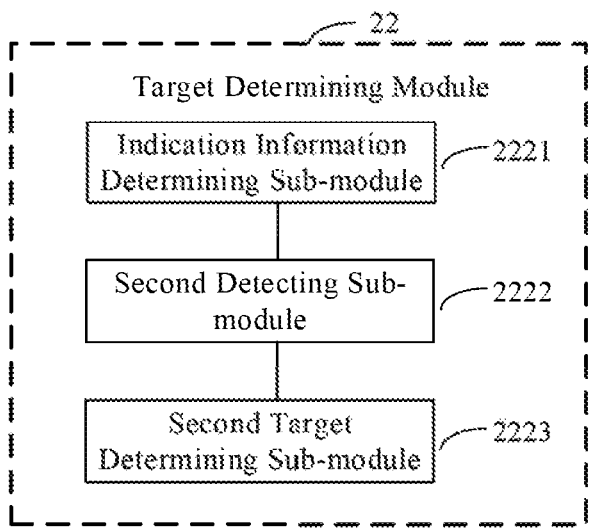
FIG. 12 is a block diagram illustrating a device for determining transmission direction information according to another exemplary embodiment of the present disclosure.

FIG. 12 is a block diagram illustrating a device for determining transmission direction information according to another exemplary embodiment of the present disclosure. Based on the embodiment of the device as shown in FIG. 10, the target determining module 22 can include an indication information determining sub-module 2221 that is configured to determine, according to the direction configuration information, at least two pieces of direction indication information for a preset basic information transmission unit, a second detecting sub-module 2222 that is configured to determine whether the at least two pieces of direction indication information are consistent with each other, and a second target determining sub-module 2223 that is configured to determine, when the at least two pieces of direction indication information are not consistent with each other, the preset basic information transmission unit as the target information transmission unit.

Figure 13:
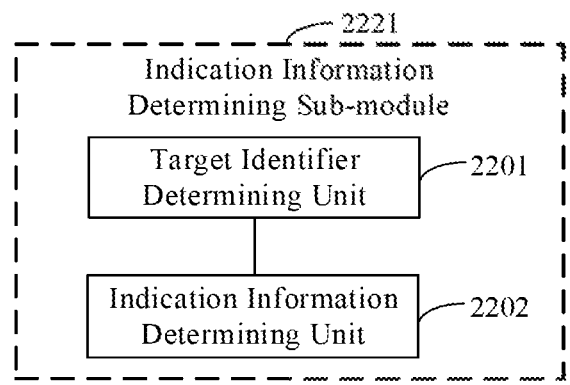
FIG. 13 is a block diagram illustrating a device for determining transmission direction information according to another exemplary embodiment of the present disclosure.

In another embodiment of the disclosure, the direction configuration information further includes identification information of the basic information transmission unit. FIG. 13 is a block diagram illustrating a device for determining transmission direction information according to another exemplary embodiment of the present disclosure. Correspondingly, based on the embodiment of the device as shown in FIG. 12, the indication information determining sub-module 2221 can include a target identifier determining unit 2201 that is configured to determine whether there is a repeated indication identifier according to the identification information of the basic information transmission unit included in each piece of direction configuration information, and an indication information determining unit 220 that is configured to determine, when the repeated indication identifier is present, the at least two pieces of direction indication information corresponding to the repeated indication identifier.

Figure 14:
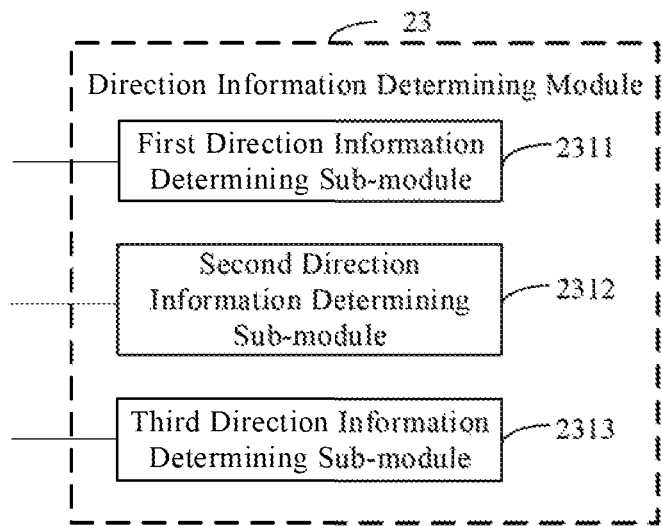
FIG. 14 is a block diagram illustrating a device for determining transmission direction information according to another exemplary embodiment of the present disclosure.

FIG. 14 is a block diagram illustrating a device for determining transmission direction information according to another exemplary embodiment of the present disclosure. Based on the embodiment of the device as shown in FIG. 11, the direction information determining module 23 includes any one of a first direction information determining sub-module 2311 that is configured to determine, according to direction indication information of an indicated transmission unit, the transmission direction information for the target information transmission unit, wherein the indicated transmission unit is a basic information transmission unit within a same detection time range as the target information transmission unit, or a second direction information determining sub-module 2312, configured to determine the transmission direction information of the target information transmission unit as unknown configuration, or a third direction information determining sub-module 2313, configured to determine the transmission direction information of the target information transmission unit according to first preset direction configuration information.

Figure 15:
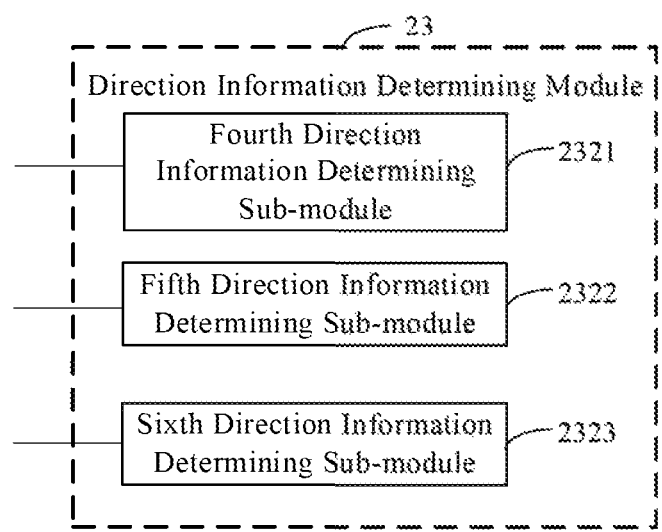
FIG. 15 is a block diagram illustrating a device for determining transmission direction information according to another exemplary embodiment of the present disclosure.

FIG. 15 is a block diagram illustrating a device for determining transmission direction information according to another exemplary embodiment of the present disclosure. Based on the embodiment of the device as shown in FIG. 12, the direction information determining module 23 can include any one of a fourth direction information determining sub-module 2321, configured to determine, according to latest direction indication information as obtained, the transmission direction information for the target information transmission unit, or a fifth direction information determining sub-module 2322, configured to determine the transmission direction information of the target information transmission unit as unknown configuration, or a sixth direction information determining sub-module 2323, configured to re-determine the transmission direction information of the target information transmission unit according to first preset direction configuration information.

Figure 16:
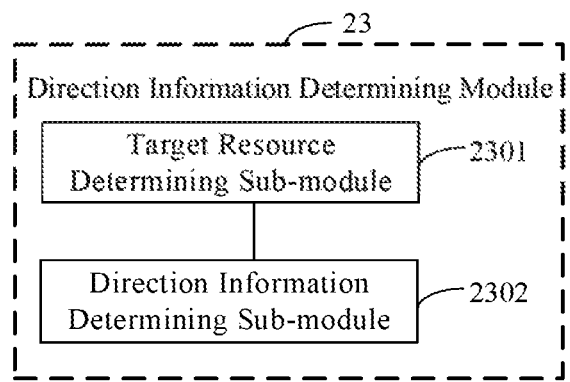
FIG. 16 is a block diagram illustrating a device for determining transmission direction information according to another exemplary embodiment of the present disclosure.

In another embodiment of the device according to the disclosure, when the basic information transmission unit is composed of unit time domain resource with smaller resource granularity, and the direction indication information has a direction indication granularity based on the unit time domain resource, referring to FIG. 16, which is a block diagram illustrating a device for determining transmission direction information according to another exemplary embodiment, based on the embodiment of the device as shown in FIG. 12. The direction information determining module 23 can include a target resource determining sub-module 2301 that is configured to determine, according to at least two pieces of direction indication information corresponding to the target information transmission unit, target unit time domain resource with inconsistent direction indication, and a direction information determining sub-module 2302 that is configured to determine, according to second preset direction configuration information, the transmission direction information for the target unit time domain resource.

For the device embodiment, since it basically corresponds to the method embodiment, the relevant part can be referred to the description of the method embodiment. The device embodiments described above are only schematic, wherein the modules described as separate components may be or may not be physically separated, and the components displayed as units may be or may not be physical units, that is, may be located at the same place or may be distributed to multiple network elements. Some or all of the modules may be selected according to actual needs to achieve the objectives of the disclosed solutions. Those of ordinary skill in the art can understand and implement the solutions without paying creative labor.

Accordingly, an aspect of the disclosure provides an apparatus for determining transmission direction information, including a processor and a memory for storing instructions executable by processor. In an embodiment, the processor can be configured to acquire direction configuration information dynamically sent by a base station, the direction configuration information being indicative of transmission direction information of information transmission resource, determine, according to the direction configuration information, a target information transmission unit indicated with undetermined transmission direction, and determine transmission direction information for the target information transmission unit according to a preset rule.

Figure 17:
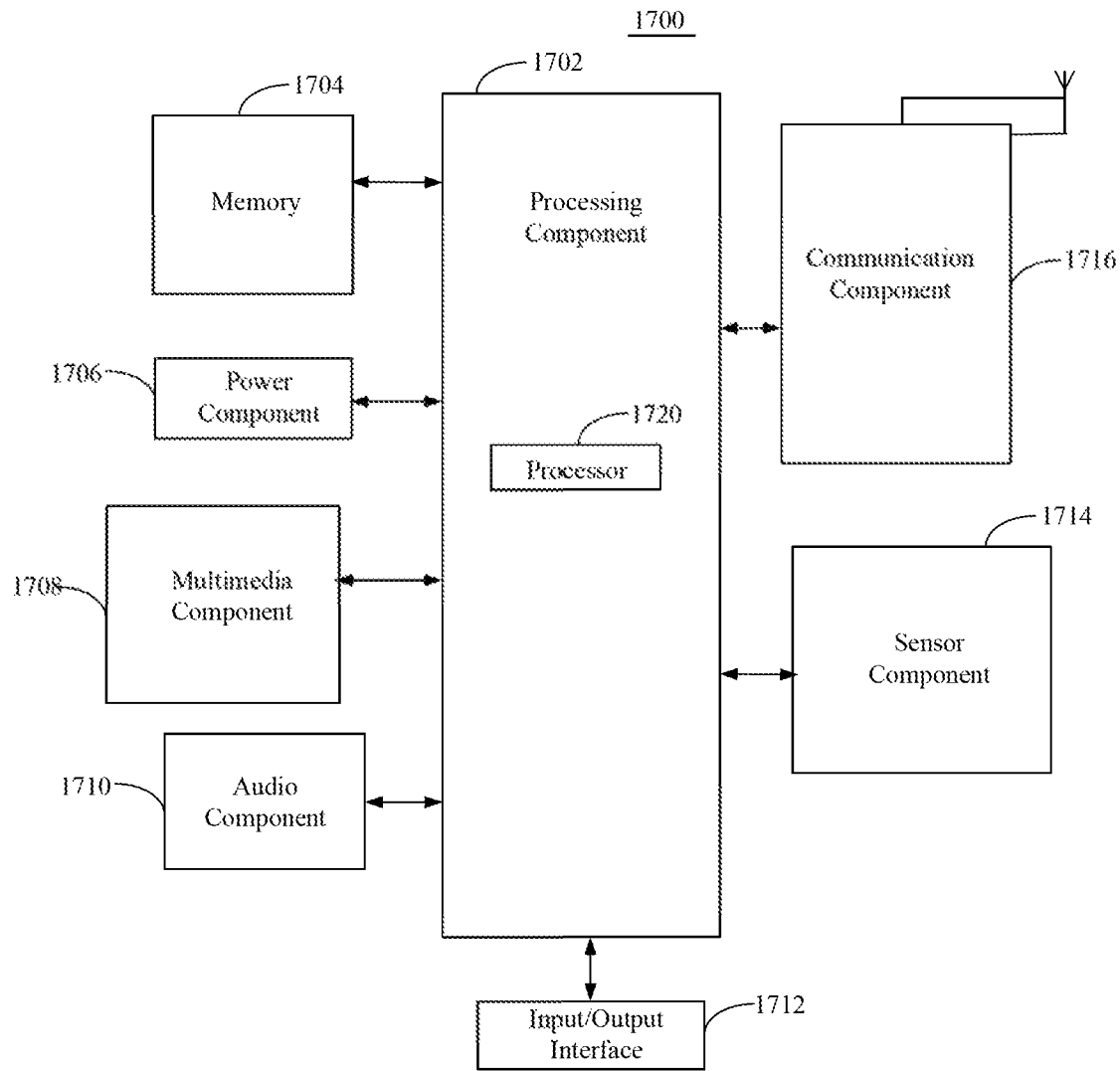
FIG. 17 is a schematic structural diagram illustrating an apparatus for determining transmission direction information according to an exemplary embodiment of the present disclosure.

FIG. 17 is a schematic structural diagram illustrating an apparatus 1700 for determining transmission direction information according to an exemplary embodiment of the present disclosure. For example, the apparatus 1700 may be a user equipment in the 5G network, for example, a mobile phone, a computer, a digital broadcasting terminal, a messaging device, a game console, a tablet device, a medical device, a fitness device, a personal digital assistant, and a wearable device such as smart watches, smart glasses, smart bracelets, smart running shoes and the like. The use equipment may be provided in another equipment with types of eMBB (enhanced Mobile Broad Band), mMTC (massive machine type communication), URLLC (Ultra Reliable Low Latency Communication) in 5G network.

Referring to FIG. 17, the apparatus 1700 may include one or more of the following components: a processing component 1702, a memory 1704, a power component 1706, a multimedia component 1708, an audio component 1710, an input/output (I/O) interface 1712, and a sensor component 1714, and a communication component 1716.

The processing component 1702 generally controls the overall operations of the apparatus 1700, such as operations associated with display, telephone calls, data communication, camera operations, and recording operations. The processing component 1702 may include one or more processors 1720 to execute instructions to complete all or part of the steps in the above method. In addition, the processing component 1702 may include one or more modules to facilitate interaction between the processing component 1702 and other components. For example, the processing component 1702 may include a multimedia module to facilitate interaction between the multimedia component 1708 and the processing component 1702.

The memory 1704 is configured to store various types of data to support operation at the apparatus 1700. Examples of these data include instructions for any application or method operating on the apparatus 1700, contact data, phone book data, messages, pictures, videos, and so on. The memory 1704 may be implemented by any type of volatile or non-volatile storage device or a combination thereof, such as static random access memory (SRAM), electrically erasable programmable read only memory (EEPROM), erasable and removable programmable read only memory (EPROM), programmable read only memory (PROM), read only memory (ROM), magnetic memory, flash memory, magnetic disk or optical disk.

The power component 1706 provides power to various components of the apparatus 1700. The power component 1706 may include a power management system, one or more power supplies, and other components associated with generating, managing, and distributing power for the apparatus 1700.

The multimedia component 1708 includes a screen that provides an output interface between the above-described apparatus 1700 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, swipe, and gestures on the touch panel. The above-mentioned touch sensor may not only sense the boundary of the touch or sliding action, but also detect the duration and pressure related to the above-mentioned touch or sliding operation. In some embodiments, the multimedia component 1708 includes a front camera and/or a rear camera. When the apparatus 1700 is in an operation mode, such as a shooting mode or a video mode, the front camera and/or the rear camera may receive external multimedia data. Each front camera and rear camera may be a fixed optical lens system or have focal length and optical zoom capabilities.

The audio component 1710 is configured to output and/or input audio signals. For example, the audio component 1710 includes a microphone (MIC). When the apparatus 1700 is in an operation mode, such as a call mode, a recording mode, and a voice recognition mode, the microphone is configured to receive an external audio signal. The received audio signal may be further stored in the memory 1704 or sent via the communication component 1716. In some embodiments, the audio component 1710 further includes a speaker for outputting audio signals.

The I/O interface 1712 provides an interface between the processing component 1702 and a peripheral interface module. The peripheral interface module may be a keyboard, a click wheel, or a button. These buttons may include, but are not limited to home button, volume button, start button, and lock button.

The sensor assembly 1714 includes one or more sensors for providing various aspects of the apparatus 1700 with status assessment. For example, the sensor component 1714 can detect the on/off state of the apparatus 1700, and the relative positioning of the components. For example, the above components are the display and keypad of the apparatus 1700. The sensor component 1714 can also detect the position change of the apparatus 1700 or a component of the apparatus 1700, the presence or absence of user contact with the apparatus 1700, orientation or acceleration/deceleration, of the apparatus 1700, and the temperature change of the apparatus 1700. The sensor assembly 1714 may include a proximity sensor configured to detect the presence of nearby objects without any physical contact. The sensor assembly 1714 may also include a light sensor, such as a CMOS or CCD image sensor, for use in imaging applications. In some embodiments, the sensor assembly 1714 may also include an acceleration sensor, a gyro sensor, a magnetic sensor, a pressure sensor, or a temperature sensor.

The communication component 1716 is configured to facilitate wired or wireless communication between the apparatus 1700 and other apparatuses. The apparatus 1700 can access a wireless network based on a communication standard, such as WiFi, 2G, or 30, or a combination thereof. In an exemplary embodiment, the communication component 1716 receives a broadcast signal or broadcast related information from an external broadcast management system via a broadcast channel. In an exemplary embodiment, the communication component 1716 described above further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the apparatus 1700 may be implemented by one or more of application specific integrated circuits (ASCs), digital signal processors (DSPs), digital signal processing devices (DSPDs), programmable logic devices (PLOs), Field programmable gate array (FPGA), controller, microcontroller, microprocessor or other electronic components to perform the above method.

In an exemplary embodiment, there is also provided a non-transitory computer-readable storage medium including instructions, for example, the memory 1704 including instructions. The instructions can be executed by the processor 1720 of the apparatus 1700 to complete the above-mentioned method for determining transmission direction information. For example, the non-transitory computer-readable storage medium may be ROM, random access memory (RAM), CD-ROM, magnetic tape, floppy disk, optical data storage device, or the like.

After considering the description and practice of the disclosure disclosed herein, those skilled in the art will easily think of other embodiments of the disclosure. This application is intended to cover any variations, uses, or adaptive changes of the present disclosure that follow the general principles of the present disclosure and include common general knowledge or customary technical means in the technical field not disclosed in the present disclosure. The description and examples are to be considered exemplary only, and the true scope and spirit of this disclosure are defined by the following claims.

It should be understood that the present disclosure is not limited to the precise structure that has been described above and shown in the drawings, and that various modifications and changes can be made without departing from the scope thereof. The scope of the present disclosure is limited only by the appended claims.

What is claimed is:

1. A method for determining transmission direction information that is applied to a user equipment, the method comprising:
    acquiring direction configuration information dynamically sent by a base station, the direction configuration information being indicative of transmission direction information of information transmission resource;
    determining, according to the direction configuration information, a target information transmission unit indicated with undetermined transmission direction; and
    determining transmission direction information for the target information transmission unit according to a preset rule,
    wherein the target information transmission unit comprises a first basic information transmission unit having no corresponding direction indication information and a second basic information transmission unit indicated with at least two pieces of direction indication information that are not consistent with each other,
    wherein the direction configuration information further comprises at least direction indication information of a basic information transmission unit;
    wherein the determining, according to the direction configuration information, the target information transmission unit indicated with undetermined transmission direction further comprises:
    determining, according to the direction configuration information, the at least two pieces of direction indication information for the second basic information transmission unit;
    determining whether the at least two pieces of direction indication information are consistent with each other; and
    determining the second basic information transmission unit as the target information transmission unit when the at least two pieces of direction indication information are not consistent with each other;
    wherein the direction configuration information further comprises identification information of the basic information transmission unit; and
    wherein the determining, according to the direction configuration information, the at least two pieces of direction indication information for the second basic information transmission unit further comprises:
    determining whether there is a repeated indication identifier according to the identification information of the basic information transmission unit included in each piece of direction configuration information; and
    determining the at least two pieces of direction indication information corresponding to the repeated indication identifier when the repeated indication identifier is present.

2. The method according to claim 1, wherein the determining, according to the direction configuration information, the target information transmission unit indicated with undetermined transmission direction further comprises:
    determining the first basic information transmission unit as the target information transmission unit when the first basic information transmission unit within the preset detection time range has no corresponding direction indication information.

3. The method according to claim 1, wherein when the basic information transmission unit is composed of unit time domain resource with smaller resource granularity, and the direction indication information has a direction indication granularity based on the unit time domain resource, the determining transmission direction information for the target information transmission unit according to the preset rule further comprises:
    determining, according to the at least two pieces of direction indication information corresponding to the target information transmission unit, target unit time domain resource with inconsistent direction indication; and determining, according to second preset direction configuration information, the transmission direction information for the target unit time domain resource.

4. A non-transitory computer readable storage medium having stored thereon computer instructions, wherein the instructions are executable by a processor to perform:

acquiring direction configuration information dynamically sent by a base station, the direction configuration information being indicative of transmission direction information of information transmission resource;

determining, according to the direction configuration information, a target information transmission unit indicated with undetermined transmission direction; and determining transmission direction information for the target information transmission unit according to a preset rule, wherein the target information transmission unit comprises a first basic information transmission unit having no corresponding direction indication information and a second basic information transmission unit indicated with at least two pieces of direction indication information that are not consistent with each other, wherein the direction configuration information further comprises at least direction indication information of a basic information transmission unit;

wherein the determining, according to the direction configuration information, the target information transmission unit indicated with undetermined transmission direction further comprises:

determining, according to the direction configuration information, the at least two pieces of direction indication information for the second basic information transmission unit;

determining whether the at least two pieces of direction indication information are consistent with each other; and determining the second basic information transmission unit as the target information transmission unit when the at least two pieces of direction indication information are not consistent with each other;

wherein the direction configuration information further comprises identification information of the basic information transmission unit; and wherein the determining, according to the direction configuration information, the at least two pieces of direction indication information for the second basic information transmission unit further comprises:

determining whether there is a repeated indication identifier according to the identification information of the basic information transmission unit included in each piece of direction configuration information; and determining the at least two pieces of direction indication information corresponding to the repeated indication identifier when the repeated indication identifier is present.

5. An apparatus for determining transmission direction information, comprising:

a processor; and a memory for storing instructions executable by the processor;

wherein the processor is configured to perform:

acquiring direction configuration information dynamically sent by a base station, the direction configuration information being indicative of transmission direction information of information transmission resource;

determining, according to the direction configuration information, a target information transmission unit indicated with undetermined transmission direction; and determining transmission direction information for the target information transmission unit according to a preset rule, wherein the target information transmission unit comprises a first basic information transmission unit having no corresponding direction indication information and a second basic information transmission unit indicated with at least two pieces of direction indication information that are not consistent with each other, wherein the direction configuration information further comprises at least direction indication information of a basic information transmission unit;

wherein the processor is further configured to perform:

determining, according to the direction configuration information, the at least two pieces of direction indication information for the second basic information transmission unit;

determining whether the at least two pieces of direction indication information are consistent with each other; and determining the second basic information transmission unit as the target information transmission unit when the at least two pieces of direction indication information are not consistent with each other;

wherein the direction configuration information further comprises identification information of the basic information transmission unit; and wherein the processor is further configured to perform:

determining whether there is a repeated indication identifier according to the identification information of the basic information transmission unit included in each piece of direction configuration information; and determining the at least two pieces of direction indication information corresponding to the repeated indication identifier when the repeated indication identifier is present.

6. The apparatus according to claim 5, wherein the processor is further configured to perform:

determining the first basic information transmission unit as the target information transmission unit when the first basic information transmission unit within the preset detection time range has no corresponding direction indication information.

7. The apparatus according to claim 5, wherein when the basic information transmission unit is composed of unit time domain resource with smaller resource granularity, and the direction indication information has a direction indication granularity based on the unit time domain resource;

the processor is further configured to perform:

determining, according to the at least two pieces of direction indication information corresponding to the target information transmission unit, target unit time domain resource with inconsistent direction indication; and determining, according to second preset direction configuration information, the transmission direction information for the target unit time domain resource.

* * * * *